United States Patent [19]

Yamada et al.

[11] Patent Number: 4,730,457
[45] Date of Patent: Mar. 15, 1988

[54] SUPERCHARGING SYSTEM FOR AUTOMOTIVE ENGINES

[75] Inventors: Takemasa Yamada, Niza; Hideo Yabuhara, Musashino; Fujio Takimoto, Ichikawa, all of Japan

[73] Assignee: Fuji Jukogyo Kabushiki Kaisha, Tokyo, Japan

[21] Appl. No.: 922,276

[22] Filed: Oct. 23, 1986

[30] Foreign Application Priority Data

Oct. 29, 1985 [JP] Japan .................................. 60-242512
Oct. 29, 1985 [JP] Japan .................................. 60-242513

[51] Int. Cl.$^4$ ............................................. F02B 37/04
[52] U.S. Cl. .................................................... 60/609
[58] Field of Search ................. 60/605, 609, 610, 611, 60/612

[56] References Cited

U.S. PATENT DOCUMENTS 4,505,117 3/1985 Matsuoka .............................. 60/609

FOREIGN PATENT DOCUMENTS 58-222919 12/1983 Japan .................................... 60/610

Primary Examiner—Michael Koczo
Attorney, Agent, or Firm—Martin A. Farber

[57] ABSTRACT

A supercharging system has a turbocharger driven by exhaust-gas of the engine, a supercharger driven by an engine and communicated with the turbocharger and the engine in series. A clutch is provided in a device for driving the supercharger and a bypass having a control valve is provided around the supercharger. A control unit is provided to respond to engine operating conditions for operating the clutch and the control valve. The control unit operates to disengage the clutch at light load on the engine in a predetermined low engine speed range, to engage the clutch at heavy load in the low engine speed range, and to disengage the clutch in a predetermined high engine speed range. The control valve is gradually opened in accordance with variation of engine operation conditions when the engine operation is in a transient state.

6 Claims, 12 Drawing Figures

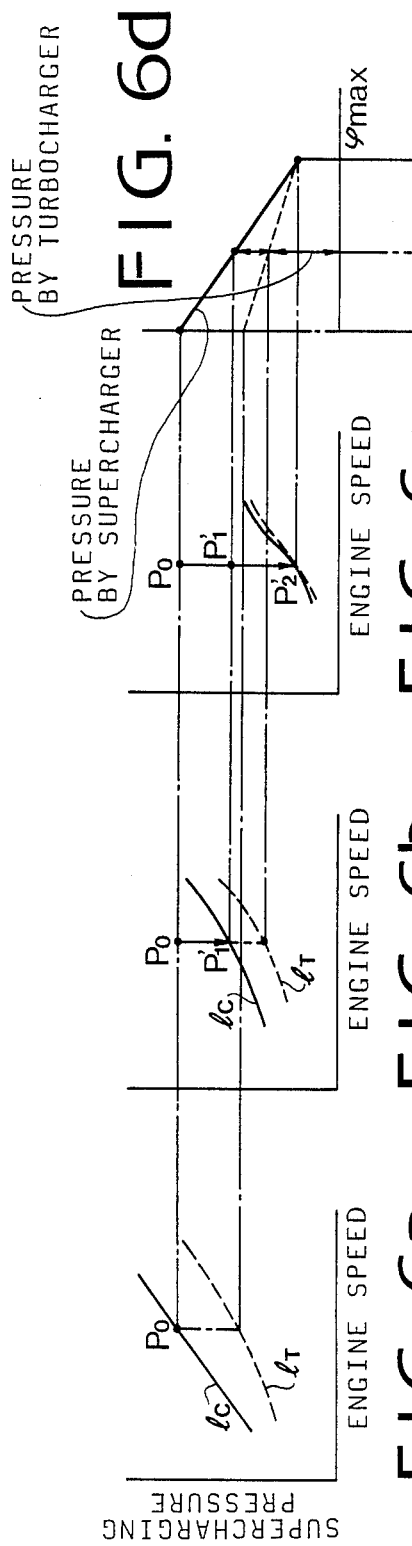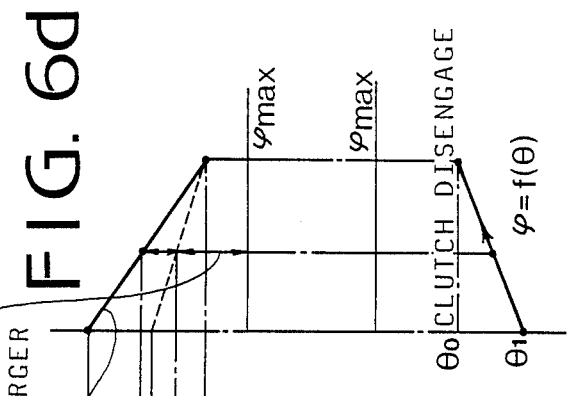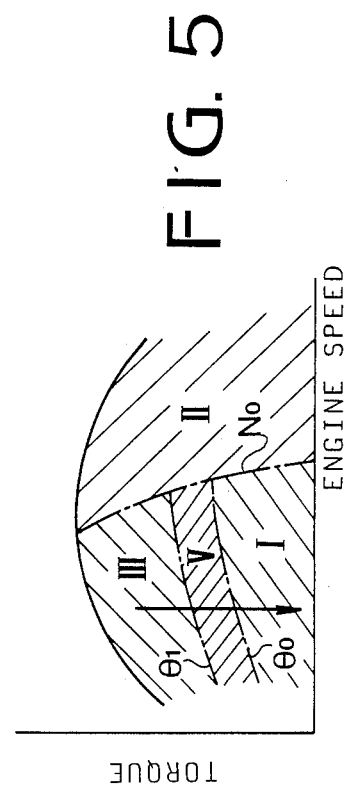

SUPERCHARGING SYSTEM FOR AUTOMOTIVE ENGINES

BACKGROUND OF THE INVENTION

The present invention relates to a supercharging system for an automotive engine, and more particularly to a combined supercharging system having a compressor driven by an exhaust-gas turbine and a compressor driven by the engine itself.

Generally, the supercharging system for motor vehicles is employed with a compressor driven by an exhaust-gas turbine (hereinafter called a turbocharger). The turbocharger is effective in supercharging in a high engine speed range, but does not act to provide a sufficient supercharging pressure in a low engine speed range.

To the contrary, a compressor driven by an engine (hereinafter called a supercharger) is effective in a low engine speed range. Accordingly, a combined supercharging system provided with a turbocharger and a supercharger has been proposed in order to improve supercharging efficiency in a wide engine speed range.

Japanese Patent Laid Open No. 58-222919 discloses a combined supercharging system in which a turbocharger and a supercharger can be selectively combined either in parallel or series. However, the system is complicated in construction and, moreover, does not have practical advantages. In addition, since the system is not controlled in accordance with load on the engine, supercharging pressure is not properly controlled at light load and heavy load in a low engine speed range. Further, the condition for changing between a single supercharging range and a combined supercharging range cannot be controlled in accordance with engine operating conditions. Accordingly, both of the operational ranges are subject to deviate from desired ranges.

SUMMARY OF THE INVENTION

The object of the present invention is to provide a combined system in which a single supercharging range and a combined supercharging range are controlled so as to correspond with engine operating conditions.

According to the present invention, there is provided a supercharging system for an automotive engine comprising a turbocharger driven by exhaust gas of the engine, a supercharger, an intake passage connecting the turbocharger and the supercharger in series for supplying air to the engine, driving means for driving the supercharger by the engine, clutch means provided in the driving means, a first bypass provided around the supercharger, a control valve provided in the bypass, a second bypass provided around the turbine of the turbocharger, a waste gate valve provided in the second bypass, a first actuator for operating the control valve, a second actuator for operating the waste gate valve, first means for operating the second actuator to open the waste gate valve when supercharging pressure exceeds a predetermined value, and an engine speed sensor for detecting speed of the engine.

The system further comprises an engine load sensor for detecting load on the engine, a control unit responsive to output signals of the engine speed sensor and engine load sensor for operating the clutch means and first actuator.

The control unit includes second means for disengaging the clutch means at light load on the engine in a predetermined low engine speed range, third means for engaging the clutch means at heavy load in the low engine speed range, fourth means for disengaging the clutch means in a predetermined high engine speed range. A fifth means is provided for controlling the opening of the control valve in accordance with variation of engine operating conditions (speed and load) when the engine operation is in a transient state.

In an aspect of the invention, the fifth means responds to the operation of the second actuator for opening the control valve.

In another aspect of the invention, the fifth means responds to the load on the engine for opening the control valve with decrease of the load.

The other objects and features of this invention will become understood from the following description with reference to the accompanying drawings.

BRIEF DESCRIPTION OF DRAWINGS

FIG. 5 is a graph showing operational ranges in another embodiment of the invention;

FIGS. 6a to 6e are graphs showing variations of supercharging pressure and opening degree of a control valve.

DETAILED DESCRIPTION OF THE PREFERRED EMBODIMENTS

Figure 1:
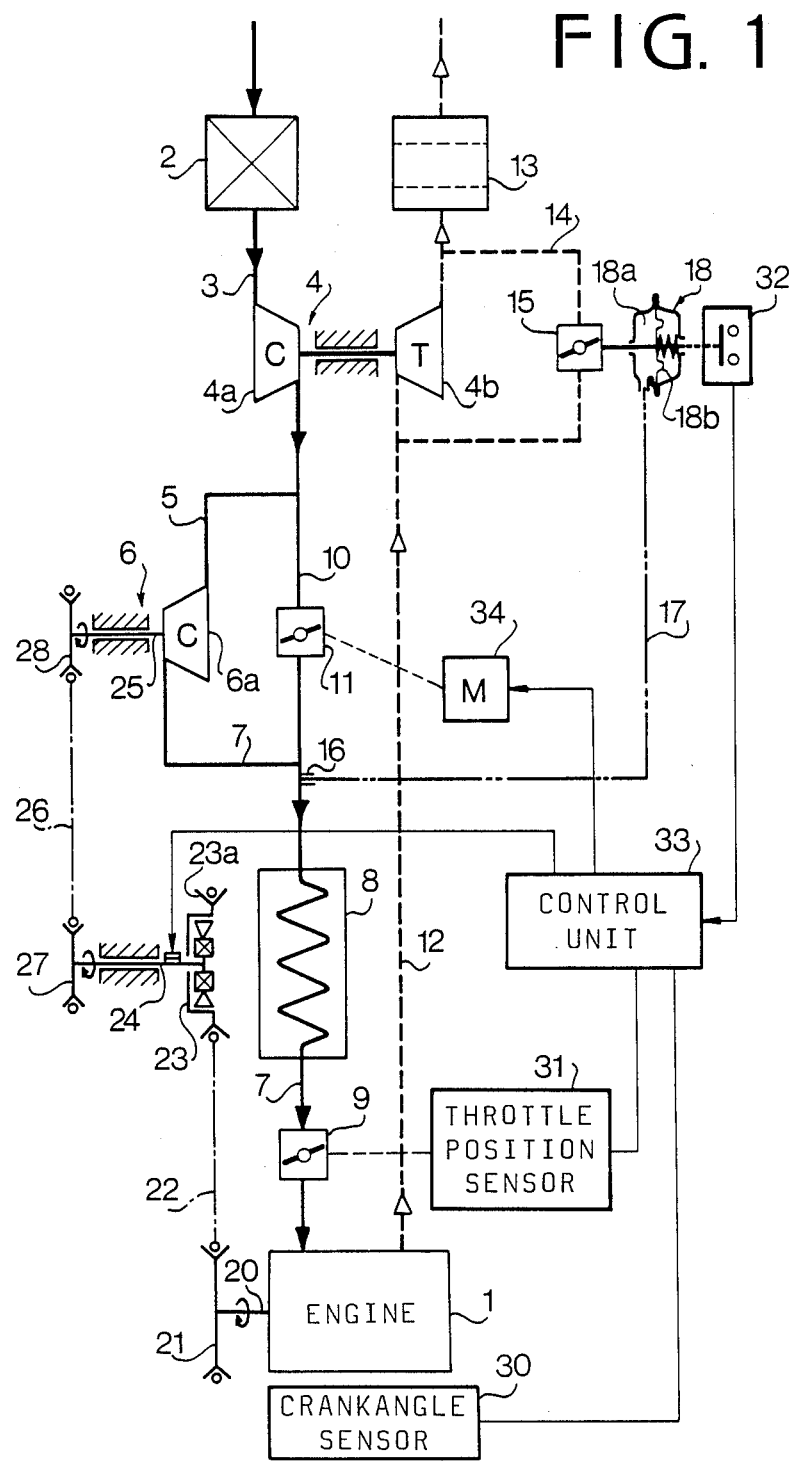
FIG. 1 is a schematic diagram of a supercharging system according to the present invention.

Referring to FIG. 1 showing a combined supercharging system according to the present invention, an engine 1 is provided with a turbocharger 4 and a supercharger 6. The turbocharger 4 comprises a compressor 4a provided in an intake pipe 3 downstream of an air-cleaner 2 and a turbine 4b provided in an exhaust pipe 12. The intake pipe 3 is communicated with a compressor 6a of the supercharger 6 through a passage 5. The compressor 6a is a displacement compressor so that the volume of discharging air is dependent only on the engine speed regardless of the load on the engine. Therefore, the volume of air does not decrease at light load. The compressor 6a is communicated with the engine 1 through a passage 7, an intercooler 8 and a throttle valve 9. Accordingly, the turbocharger 4 and the supercharger 6 are installed in series.

A bypass 10 having a control valve 11, the opening degree of which is variable, is provided for connecting the compressor 4a with the intercooler 8. In the exhaust system, a muffler 13 is provided downstream of the turbine 4b, and a bypass 14 is connected to the exhaust pipe 12 to bypass the turbine 4b. Provided in the bypass 14 is a waste gate valve 15 which is adapted to be operated by an actuator 18 having a diaphragm 18b operatively connected to the waste gate valve 15 and a chamber 18a partitioned by the diaphragm. The chamber 18a is communicated through a passage 17 with a port 16 formed in the passage 7 at a portion between a confluence of passages 7 and 10 and the throttle valve 9 so as to actuate the actuator 18.

A pulley 21 mounted on a crankshaft 20 of the engine 1, a pulley 23a secured to an outer driving member of an electromagnetic clutch 23, and a belt 22 are provided to transmit the power of the engine 1 to the clutch 23. The electromagnetic clutch 23 is connected to an intermediate shaft 24 and further to a drive shaft 25 of the compressor 6a by way of pulleys 27 and 28 and a belt 26.

The control system of the present invention is provided with a control unit 33, a crank angle sensor 30 for detecting the engine speed, a throttle position sensor 31 for detecting the throttle position and a switch 32 which is adapted to close when the waste gate valve 15 is opened. Outputs of the sensors 30 and 31 and switch 32 are applied to the control unit 33. The outputs of the control unit 33 is supplied to a stepper motor 34 for opening and closing the control valve 11 and to the electromagnetic clutch 23 for engagement and disengagement thereof.

Figure 2:
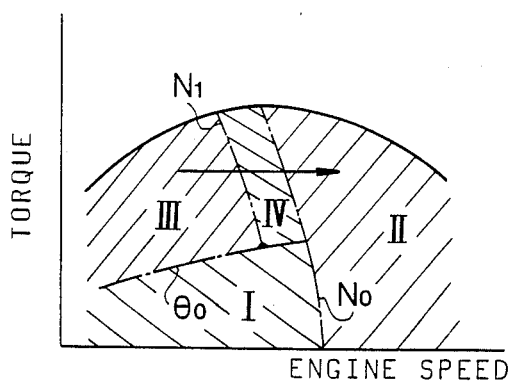
FIG. 2 is a graph showing operational ranges of a turbocharger and a supercharger of the system.
Figure 3A:
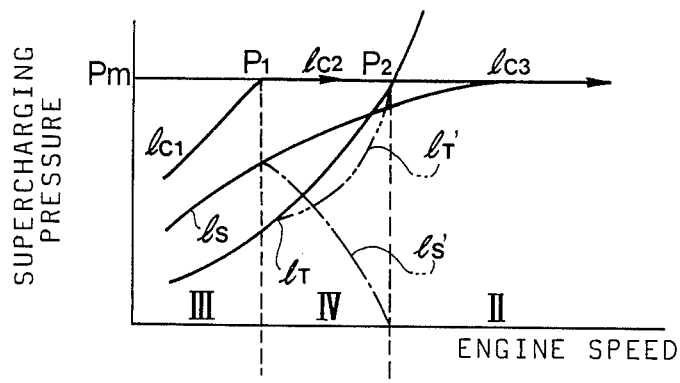
FIG. 3a is a graph showing the relationship between engine speed and supercharging pressure in the system.
Figure 3B:
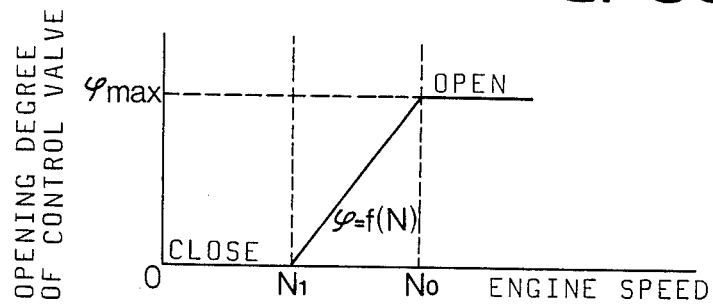
FIG. 3b is a graph showing relationship between engine speed and opening degree of a control valve.

Referring to FIG. 2, operational ranges of the turbocharger 4 and supercharger 6 are divided depending on the engine speed N and throttle valve opening degree $\theta$. Namely, there are provided a range I wherein engine speed N is lower than a predetermined value $N_0$ and the throttle opening degree $\theta$ is smaller than a predetermined degree $\theta_0$, range II wherein engine speed N is higher than $N_0$, and range III wherein engine speed N is equal to or lower than $N_0$ and the throttle opening degree $\theta$ is at or exceeds degree $\theta_0$. The engine speed $N_0$ is a value corresponding to a boundary between a high engine speed range and a middle engine speed range. In the ranges I and II, the electromagnetic clutch 23 is disengaged so that the supercharger 6 is not driven. At the same time, the control valve 11 is fully opened so that opening degree $\phi$ is at maximum. Accordingly, only turbocharger 4 is driven. In the range III, the electromagnetic clutch 23 is engaged to drive the supercharger 6 and the control valve 11 is closed. Consequently, the turbocharger 4 and supercharger 6 are both driven and connected in series. A transient range IV wherein the engine speed is between $N_0$ and a predetermined value $N_1$, which is lower than $N_0$ is included in the range III. As shown in FIG. 3b, in the range IV, the control valve 11 is gradually opened as the engine speed increases. The variation of the opening degree $\phi$ between $N_1$ and $N_0$ is not necessarily linear.

Figure 4:
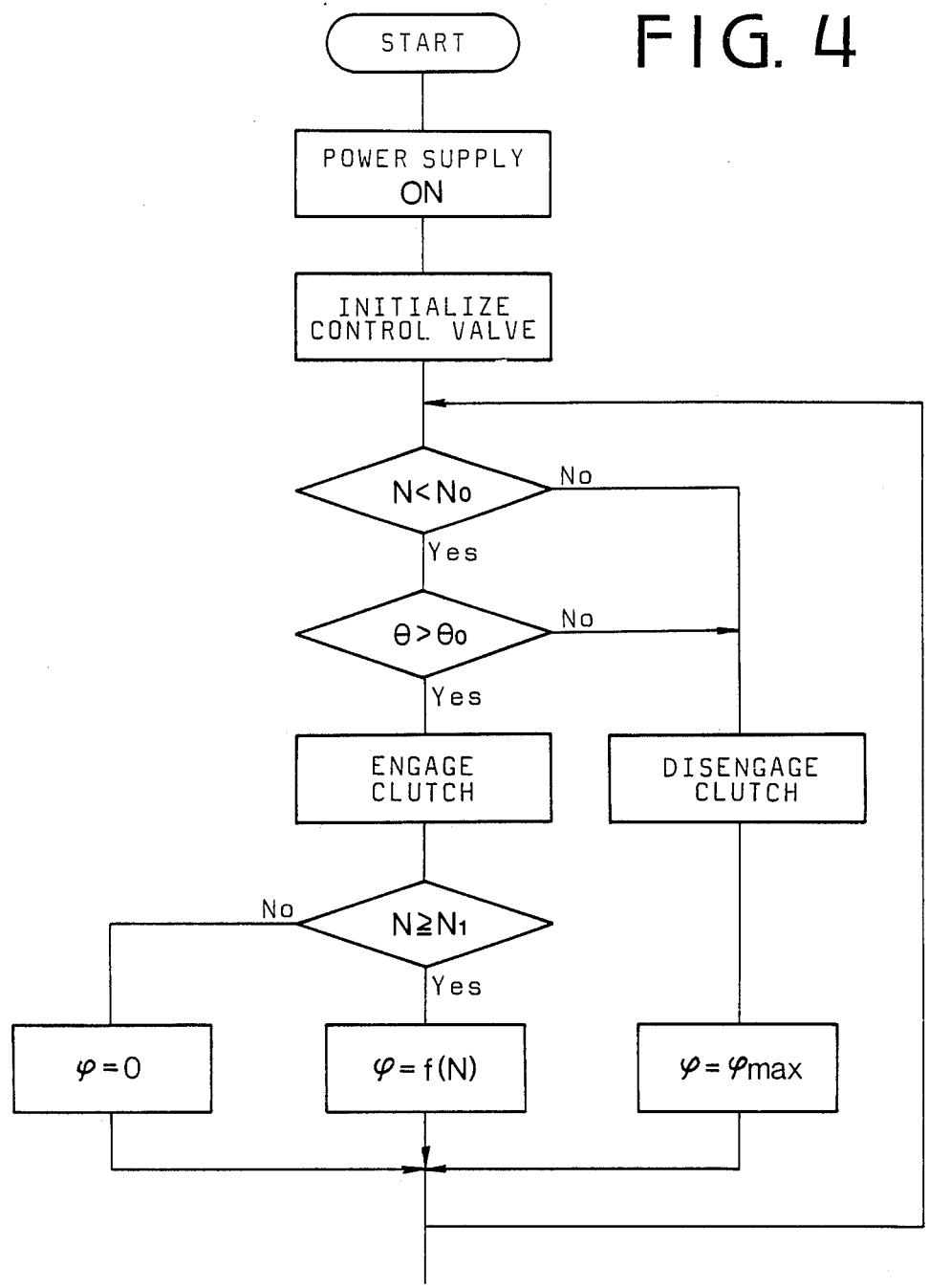
FIG. 4 is a flowchart showing the operation of the system according to the present invention.

The operation of the supercharging system will be described with reference to FIGS. 3a, 3b and 4. In FIG. 3a line $1_T$ and line $1_S$ represent supercharging pressure characteristics of the turbocharger 4 and the supercharger 6, respectively.

Since the turbine 4b of the turbocharger 4 is driven by the exhaust gas, the turbocharger 4 is always operated as long as the engine 1 is driven. In the range I at light load including idling and throttle opening degree $\theta$ smaller than $\theta_0$, the electromagnetic clutch 23 is disengaged to cut off the supercharger 6. Furthermore, the control valve 11 is opened to the maximum degree so that all of the intake air passes through the bypass 10. Accordingly, only turbocharger 4 is driven. However, the energy of the exhaust gas is so small that supercharging is substantially ineffective.

When the throttle valve 9 is further opened to or exceeds the predetermined degree $\theta_0$, the driving condition is in range III. The control unit 33 produces the output dependent on the output of the throttle sensor 31 to engage the electromagnetic clutch 23. Therefore, the supercharger 6 is driven. Further, the control valve 11 is entirely closed so that all of the intake air from the compressor 4a is further pressurized by the supercharger 6 and cooled by the intercooler 8 before flowing into the engine 1. As a result, the supercharging operation by the turbocharger 4 is multiplied by the supercharger 6, so that the supercharging pressure is rapidly increased as shown by a line $lc_1$ in FIG. 3a which is the sum of the pressures of lines $1_T$ and $1_S$. Accordingly, the supercharging efficiency is increased.

When engine speed exceeds the speed $N_1$, the condition of the system enters the range IV. When the combined supercharging pressure reaches a maximum supercharging pressure $P_m$ at a point $P_1$, the diaphragm 18b of the actuator 18 is deflected by the supercharging pressure at the port 16 so that the waste gate valve 15 begins to open. Thus, the exhaust gas bypasses the turbine 4b to limit the supercharging operation. By the deflection of the diaphragm 18b, the switch 32 is closed to apply a signal to the control unit 33. In response to the signal, the control unit 33 controls stepper motor 34 so as to gradually open the control valve 11 in accordance with the increase of the engine speed as shown in FIG. 3b. *As a result, the supercharging pressure of the supercharger 6 is decreased as shown by the chain line $l_S'$* in FIG. 3a. To the contrary, the supercharging pressure of the turbocharger 4 increases as shown by the chain line $1_T'$. Therefore, the combined supercharging pressure becomes constant as shown by a line $l_{c2}$.

When the engine speed N exceeds $N_0$ at a point $P_2$, the driving condition is in range II. At the point $P_2$, the control valve 11 is completely opened so that supercharging pressure of the supercharger 6 drops to substantially zero. At the same time, the electromagnetic clutch 23 is again disengaged by a signal from the control unit 33 to terminate the driving of the supercharger 6. Since the waste gate valve 15 is opened when the supercharging pressure exceeds the maximum supercharging pressure $P_m$, the supercharging pressure by the turbocharger 4 is kept constant as shown by line $l_{c3}$.

On the other hand, during deceleration of the engine from the range II, if the shock caused by starting of the operation of the supercharger 6 is not significant, the system may be controlled such that when the engine speed reaches $N_0$, the electromagnetic clutch 23 is engaged and the control valve 11 is closed to operate the supercharger 6.

Figure 7:
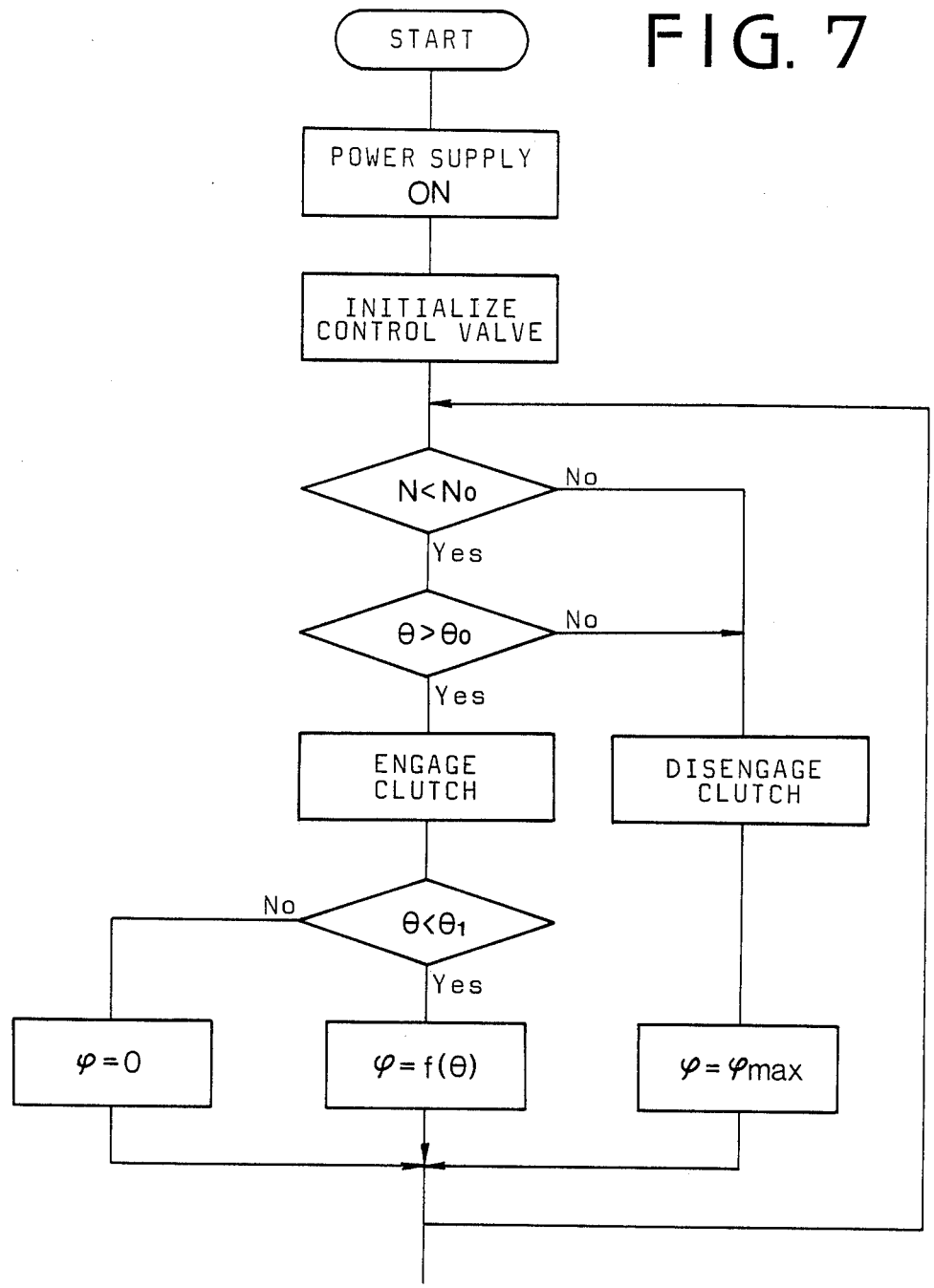
FIG. 7 is a flowchart showing the operation of a second embodiment.

Another embodiment of the present invention is described with reference to FIGS. 5 to 7. The construction of the supercharging system is substantially same as that of the first embodiment. The system of the second embodiment is adapted to be applied to a transient period at light load in a low engine speed range so that a turbocharger is driven alone during deceleration of a vehicle.

Referring to FIG. 5, a transient range V is provided in the range III in the low engine speed range. In the range V, throttle valve opening degree $\theta$ is larger than $\theta_0$ and smaller than a predetermined degree $\theta_1$. As shown in FIG. 6e, in the range V, the opening degree $\phi$ of the control valve 11 is gradually increased as the throttle valve opening degree $\theta$ decreases.

The operation of the supercharging system, when the throttle 9 is gradually closed at a constant engine speed, is described hereinafter with reference to FIGS. 6 and 7. Lines $1_T$ and $l_c$ in FIGS. 6a to 6d represent supercharging pressure characteristics of the turbocharger 4 and combined supercharging pressure characteristics of turbocharger 4 and supercharger 6, respectively.

As described about the operation in the range III, the control valve 11 is completely closed and the electromagnetic clutch 23 is engaged. Accordingly, the turbocharger 4 and supercharger 6 are both driven. When the throttle valve opening degree $\theta$ becomes smaller than $\theta_1$, the driving condition enters range V. At that time, the supercharging pressure is at $P_0$ which is a combined value of the supercharging pressures of the turbocharger 4 and supercharger 6. As the throttle valve opening degree $\theta$ decreases, the control unit 33 applies an output signal thereof to the stepper motor 34 to increase the opening degree $\phi$ of the control valve 11 in accordance with the graph of FIG. 6e. Consequently, as shown in FIGS. 6b, 6c and 6d, the supercharging pressure decreases from $P_0$ to $P_1'$. When the control valve 11 is opened to the maximum degree, since the pressure at inlet and outlet of the supercharger 6 becomes equal, the supercharging pressure is provided solely by the turbocharger 4. At that time, the throttle opening degree is at $\theta_0$ and the supercharging pressure of the supercharger 6 is substantially zero. Accordingly, the supercharging pressure is further reduced to $P_2'$.

When the throttle valve opening degree $\theta$ becomes smaller than $\theta_0$, the driving condition enters range I. Therefore, only turbocharger 4 is driven.

Although the present embodiment has been described as a supercharging system during the transient period from range III to range I, the system may be applied to the transient period from I to III in reverse.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A supercharging system for an automotive engine comprising:
    a turbocharger driven by exhaust-gas of the engine;
    a supercharger;
    an intake passage connecting the turbocharger and the supercharger in series, for supplying air to the engine;
    driving means for driving the supercharger by the engine;
    clutch means provided in the driving means;
    a first bypass provided around the supercharger;
    a control valve provided in the first bypass;
    a second bypass provided around the turbine of the turbocharger;
    a waste gate valve provided in the second bypass;
    a first actuator for operating the control valve;
    a second actuator for operating the waste gate valve;
    first means for operating the second actuator to open the waste gate valve when supercharging pressure exceeds a predetermined value;
    an engine speed sensor for detecting speed of the engine;
    an engine load sensor for detecting load on the engine;
    a control unit responsive to output signals of the engine speed sensor and engine load sensor for operating the clutch means and first actuator;
    the control unit including second means for disengaging the clutch means at light load on the engine in a predetermined low engine speed range, third means for engaging the clutch means at heavy load in the low engine speed range, fourth means for disengaging the clutch means in a predetermined high engine speed range;
    fifth means for controlling the opening of the control valve in accordance with variation of engine speed and load when the engine operation is in a transient state.

2. The supercharging system according to claim 1 further comprising a switch responsive to the operation of the second actuator for producing a signal, said fifth means is responsive to the signal for opening the control valve.

3. The supercharging system according to claim 1 wherein the fifth means is responsive to the load on the engine for opening the control valve with decrease of the load.

4. The supercharging system according to claim 1 wherein the driving means comprises a pulley and belt device operatively connecting a crankshaft of the engine to a compressor of the supercharger, and the clutch means is an electromagnetic clutch provided in the pulley and belt device.

5. The supercharging system according to claim 1 wherein the first actuator is a stepper motor, the second actuator has a diaphragm, and the first means is operative to apply the supercharging pressure to the diaphragm to open the waste gate valve.

6. The supercharging system according to claim 1 wherein the engine speed sensor is a crank angle sensor and the engine load sensor is a throttle position sensor.

* * * * *